(12) United States Patent
Grouzdev

(10) Patent No.: US 8,918,788 B2
(45) Date of Patent: Dec. 23, 2014

(54) SCHEDULING VIRTUAL CPU BASED ON PRIORITY CALCULATED USING TIME STATISTICS

(75) Inventor: Vladimir Grouzdev, Paris (FR)

(73) Assignee: Virtuallogix SA (FR)

( * ) Notice: Subject to any disclaimer, the term of this patent is extended or adjusted under 35 U.S.C. 154(b) by 822 days.

(21) Appl. No.: 12/947,067

(22) Filed: Nov. 16, 2010

(65) Prior Publication Data

US 2011/0119422 A1 May 19, 2011

(30) Foreign Application Priority Data

Nov. 16, 2009 (EP) .................................. 09290869

(51) Int. Cl.
*G06F 9/46* (2006.01)
*G06F 9/50* (2006.01)
*G06F 9/52* (2006.01)
*G06F 9/48* (2006.01)

(52) U.S. Cl.
CPC .............. *G06F 9/5077* (2013.01); *G06F 9/524* (2013.01); *G06F 9/4881* (2013.01)
USPC ........................................................ 718/103

(58) Field of Classification Search
None
See application file for complete search history.

(56) References Cited

U.S. PATENT DOCUMENTS 6,675,190 B1 * 1/2004 Schabernack et al. ......... 718/102
8,296,767 B1 * 10/2012 Waldspurger et al. ......... 718/102

OTHER PUBLICATIONS

Weng et al. ("The Hybrid Scheduling Framework for Virtual Machine Systems"VEE'09: Proceedings of the 2009 ACM SIGPLAN/ SIGOPS International Conference on Virtual Execution Environments; Washington, DC, USA; Mar. 11-13, 2009, ACM Press, US, (Jan. 1, 2009), pp. 111-120).*
Govil et al. ("Cellular Disco: Resource Management Using Virtual Clusters on Shared-Memory Multiprocessors"Operating Systems Review, ACM, New York, NY, vol. 33, No. 5, (Dec. 1, 1999), pp. 154-169).*
European Search Report; European Patent Application No. EP 09290869.8; May 10, 2010; 8 pages.
Thomas Friebel; Preventing Guests from Spinning Around: How to Deal with Lock-Holder Preemption; Jun. 23, 2008; 39 pages.
Co-Scheduling SMP VMs in VMware ESX Server, Nov. 16, 2010.
Gabriel Southern; Analysis of SMP VM CPU Scheudling; 2008.

* cited by examiner

*Primary Examiner* — Meng An
*Assistant Examiner* — Eric C Wai
(74) *Attorney, Agent, or Firm* — Beem Patent Law Firm

(57) ABSTRACT

The present invention provides a scheduling method for a data processing system comprising at least one physical CPU, and one or more virtual machines each assigned to one or more virtual CPUs, the method comprising: a first scheduling step in which one of said virtual machines is elected to run on said physical CPU; and a second scheduling step in which at least one of the virtual CPUs assigned to the elected virtual machine is elected to run on said physical CPU. The second scheduling step is applied to the virtual machine only. When a virtual machine instance is elected to run on a given CPU, the second level scheduling determines the virtual CPU instance to run. The second level scheduling is global and can cause a virtual CPU migration from one physical CPU to another. In order to ensure correct task scheduling at guest level, virtually equivalent (in terms of calculation power) virtual CPUs should be provided to the scheduler. This is achieved by the second level scheduler using a virtual CPU election criteria based on time statistics.

6 Claims, 1 Drawing Sheet

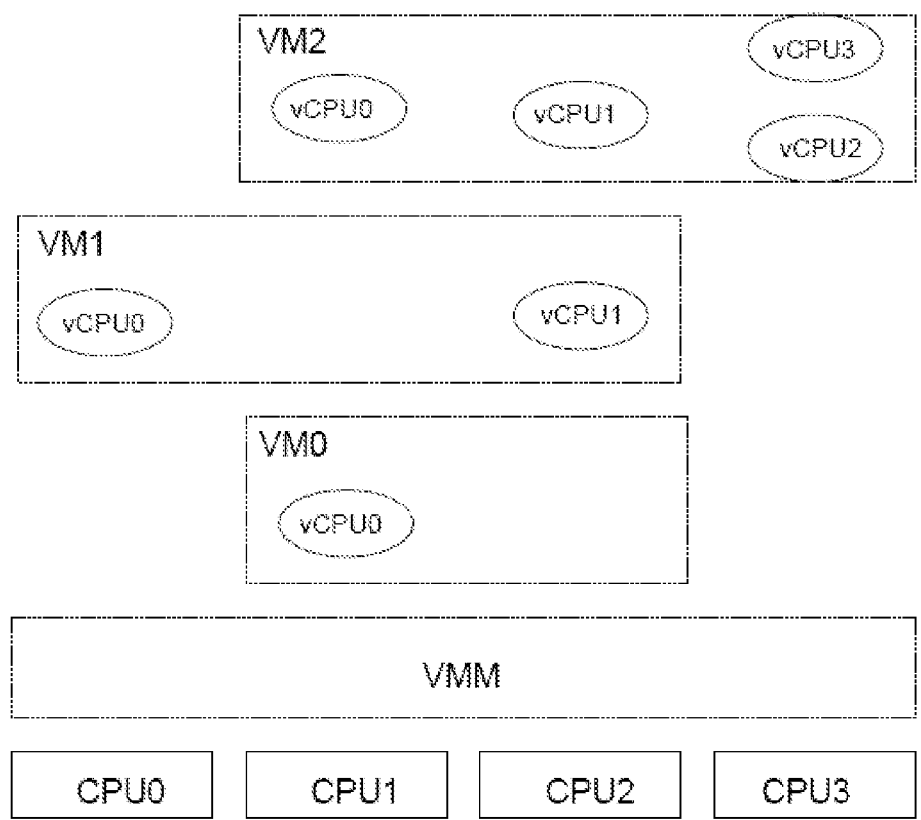

SCHEDULING VIRTUAL CPU BASED ON PRIORITY CALCULATED USING TIME STATISTICS

CROSS-REFERENCE TO RELATED APPLICATIONS

This U.S. patent application claims the benefit of priority from European patent application no. 09290869.8, filed Nov. 16, 2009.

BACKGROUND

A virtual machine is a self-contained execution environment that behaves as if it is a separate computer and which can run its own operating system. Virtual machines (VMs) provide virtual CPUs (vCPUs) to clients or "guests", and each VCPU runs on a dedicated physical CPU. A vCPU is a representation of a physical processor within a Virtual Machine. In conventional systems, the mapping between virtual and physical CPUs is static.

A scheduler is a component that schedules requests for the vCPUs assigned to a Virtual Machine to the physical CPUs. When a Virtual Machine uses its vCPU, it has to find a free physical CPU for the Virtual Machine to use. Typically, the number of vCPUs outnumbers the number of physical CPUs. As a result, the Virtual Machines are competing to use the limited number of available physical CPUs. The scheduler's task is to find CPU time for all the Virtual Machines that are requesting it, and to do it in a balanced way in order to prevent performance losses for any of the Virtual Machines. This can be difficult, particularly when Virtual Machines are assigned multiple vCPUs (Symmetric MultiProcessing Virtual Machines, SMP VMs).

Examples of SMP Virtual Machine scheduling are described at the following http webpages: cs.gmu.edu/~hfoxwell/cs671projects/southern_v12n.pdf, communities.vmware.com/docs/DOC-4960, and xen.org/files/xensummit-boston08/LHP.pdf.

A typical use case is the following. A Virtual Machine Monitor (VMM) is running on a platform having two physical CPUs, namely CPU0 and CPU1, and provides two Virtual Machines VM (A) and VM (B). VM (A) is assigned to CPU0 and runs a high priority (mono-processor) Real-Time Operating System (RTOS). VM (B) is assigned to CPU0 and CPU1 and runs a lower priority (multi-processor) General Purpose Operating System (GPOS). Such a configuration allows the RTOS to use unlimited CPU0 resource, and when the RTOS is idle, the CPU0 resource can be provided to the GPOS.

Based on this use case, the following scheduler requirements can be formulated:

REQ 1: It should be possible to share a physical CPU among multiple VMs using either a priority or fair-share based policy.

REQ 2: It should be possible to run a lower priority SMP guest on physical CPUs which can be shared with a higher priority (SMP or UP (uniprocessor)) guest.

While some conventional schedulers meet the first requirement REQ1 allowing the physical CPU to be shared among multiple guests, the second, SMP-specific requirement REQ 2 is quite challenging. Two main issues should be resolved in order to avoid undesirable side effects in the multi-processor OS which can be caused by a vCPU pre-emption:

1. A vCPU pre-emption can cause a useless busy loop in another vCPU. This typically happens when a vCPU is trying to obtain a spin lock owned by another vCPU which has been pre-empted.

2. A vCPU pre-emption is not taken into account by the guest OS scheduler and therefore it is possible for a task to be executing on a vCPU which has been pre-empted while some other vCPUs are idle.

The present invention aims to address this and other problems of conventional schedulers.

SUMMARY OF THE INVENTION

The invention is recited by the independent claims. Preferred features are recited by the dependent claims.

In particular, according to the present invention, there is provided a scheduling method for a data processing system comprising at least one physical CPU, and one or more virtual machines each assigned to one or more virtual CPUs, the method comprising: a first scheduling step in which one of said virtual machines is elected to run on said physical CPU; and a second scheduling step in which at least one of the virtual CPUs assigned to the elected virtual machine is elected to run on said physical CPU.

Accordingly, the present invention is directed to a two level scheduler, and particularly to a local (first) scheduling level and a global (second) scheduling level. The first level scheduling is performed locally on each physical CPU. At this step, the scheduler elects a VM to run. This is done using priority-based and/or fair-share scheduling policies. In particular, the first level scheduling distributes the CPU resources among VMs assigned to this CPU. The second level scheduler is applied only to the (SMP) VM in order to elect a virtual CPU to run on this physical CPU from all virtual CPUs belonging to the VM elected at the first level. Unlike, the first scheduling level which is local, the second one is global because all virtual CPUs (possibly running on other physical CPUs) are involved.

In one preferred aspect of the invention, the second scheduling step comprises making the virtual CPU selection based on a waiting time Tw associated with each of the virtual CPUs, wherein the waiting time reflects the time for transition from ready to running state. The waiting time Tw is cumulative to reflect all past transitions in a given operation cycle. Preferably, this includes assigning a scheduling priority P to each of the virtual CPUs in accordance with the waiting time Tw associated with each of the virtual CPUs, such that the selection can be performed based on the scheduling priority P.

The highest priority P which is used in the election of virtual CPUs can be calculated from the following formula:

$$P = Tw + Bm + Bl,$$

wherein Tw designates the cumulative waiting time, Bi designates an interrupt masking bonus and Bl designates a locality bonus. Bi is chosen to be a large enough to promote virtual CPUs with masked interrupts, while Bl can be arbitrarily chosen in order to promote local virtual CPUs (already running on this processor), thereby moderating virtual CPUs migrations from one physical CPU to another. Preferably, Bl at least corresponds to the virtual CPU migration overhead, i.e., the time needed to migrate a virtual CPU from one physical CPU to another.

BRIEF DESCRIPTION OF THE DRAWINGS

FIG. 1 illustrates schematically the architecture of a system comprising physical CPUs, virtual CPUs, and client (guest) applications (operating systems), to which the present invention can be applied.

DETAILED DESCRIPTION OF EMBODIMENTS OF THE INVENTION

CPU Load Balancing

According to an embodiment of the invention, a two level scheduler is provided. The first level is a "per CPU" scheduler for managing the scheduling of virtual machines. The first level scheduler may implement a priority based scheduling comprising fair-share extensions. An instance of a (SMP) Virtual Machine VM is provided on each CPU where it runs. The scheduling policy is CPU specific and may vary from one CPU to another. For example, on one physical CPU a priority based mechanism can be used, while on another CPU a fair-share mechanism can be applied.

The second level scheduling is applied to the (SMP) VM only. When an SMP VM instance is elected to run on a given CPU, the second level scheduling determines the vCPU instance to run. The second level scheduling is global and can cause a vCPU migration from one physical CPU to another.

Virtual CPU migration is a consequence of the second scheduling step which is global by definition. The second level scheduler may elect a virtual CPU which has previously been running on another physical CPU. However, even though the scheduling process is global, the scheduling is performed independently on each physical CPU. In the first step a VM is elected to run on a given CPU, and in the second step a virtual CPU (from this VM) is elected. Preferably, the second step is synchronized between schedulers running on different CPUs as they access/modify the global VM state shared among physical CPUs.

In order to ensure correct task scheduling at SMP guest level, virtually equivalent (in terms of calculation power) vCPUs should be provided to the guest scheduler. This is achieved by the second level scheduler using a vCPU election criteria based on time statistics, as described below.

For each vCPU a waiting time (Tw) is managed. The waiting time relates to the transition time from ready-to-run to running state. The vCPU waiting time is increasing when the vCPU is in ready-to-run state but there is no available physical CPU to run it. In all other vCPU states (vCPU is not ready or it is already running) the waiting time remains constant.

The table below shows how Tw is calculated at vCPU state transition time. In the formulas below, T designates the current time and Tt designates an auxiliary variable keeping the vCPU state transition time. The auxiliary variable Tt is used to calculate the vCPU waiting time. That is, the Tt variable keeps the time at which the vCPU state is last changed either (1) from non ready to ready-to-run or (2) from running to ready-to-run. (1) typically corresponds to an interrupt when the vCPU is idle and (2) typically corresponds to a vCPU preemption by another (higher priority) vCPU. Accordingly, when the vCPU is elected to run on a physical CPU, the delta between the current time (T) and the transition time (Tt) indicates the last time period during which the vCPU has been waiting for the processor in ready-to-run state. In other words, T−Tt at scheduling moment provides the delta by which the global waiting time (Tw) should be augmented, i.e. Tw=Tw+T−Tt.

| Transition | Formula |
| --- | --- |
| idle → ready | Tt = T |
| ready → running | Tw = Tw + T − Tt |
| running → ready | Tt = T |
| running → idle | |

T designates the current time which is permanently running. Accordingly, T normally has different values at vCPU state transition moment (Tt=T) and at the moment when vCPU is elected to run on a physical CPU (Tw=Tw+T−Tt). Thus, Tt keeps the time of the last vCPU state transition, as described above. For illustration purposes T can be substituted by Ts (designating the scheduling time) in order to obtain the following formula: Tw=Tw+Ts−Tt.

The election criteria comprise choosing a ready to run vCPU associated with the maximum waiting time (Tw). This has the effect of fairly sharing the globally available physical CPU calculation power among virtual CPUs. That is, the vCPU waiting time reflects the physical CPU resource starvation. Accordingly, by balancing the waiting time among vCPUs, the scheduler manages to balance the physical CPU starvation and therefore, for a given VM, it provides similar or equivalent calculation power to all vCPUs where such a power is required. In such a way, the CPU load balancing algorithm described address issue 2 outlined above.

The term "starvation" is used herein to describe a situation when the physical CPU power is insufficient to satisfy all vCPUs. In such a case, the waiting time (Tw) of some or all vCPUs is positive. On the other hand, if a given vCPU is immediately scheduled to run on a physical CPU once it becomes ready-to-run and never pre-empted by another vCPU when running, Tt and Ts are always the same and, therefore, the waiting time (Tw) of such a vCPU will always be zero. In other words, the waiting time specifies how long a given vCPU has been waiting for a physical CPU. The waiting time criteria allows to balance the waiting time of different vCPUs belonging to the same VM and therefore allows to provide to the guest operating system SMP scheduler a homogeneous (symmetric) VM in terms of vCPU performance.

Avoiding Spin Lock Holder Pre-emption

There are two possible approaches to deal with the spin lock holder pre-emption (issue 1 above):

1. The first approach consists in dropping the vCPU priority when a spin lock waiting loop is executing by the vCPU. In other words, the VLX scheduler penalizes the spin lock waiters and, as a side effect, promotes the spin lock holders.
2. The second approach consists is raising the vCPU priority when a spin lock is held by the vCPU. In other words, the VLX scheduler promotes the spin lock holders and, as a side effect, penalizes the spin lock waiters.

Each of these techniques has specific advantages and drawbacks. The main advantage of the first method is that it works for nested spin locks. The main drawback is that it is not clear at which moment the vCPU priority should be restored for the spin lock waiters. Due to a low priority, it can take a long time for such a vCPU to be scheduled again and to have the opportunity to finally join the busy loop by acquiring the spin lock.

The main advantage of the second method is that the instances where the priority is raised/dropped are well identified. The vCPU priority is raised when a spin lock is acquired and it is restored when the spin lock is released. The main drawback is that this technique does not work well for nested spin locks. For example, a vCPU can still loop waiting for a nested spin lock, which is acquired at base level by another vCPU, which has been then pre-empted. Despite this drawback, the second method may be preferable from a practical (implementation) viewpoint.

In order to simplify the second mechanism, any critical section of code where CPU interrupts are masked can be promoted. Such criterion includes all masked spin locks. The advantage of such approximation is that the CPU interrupt masking mechanism is already virtualized and therefore does not require any extra modifications in the OS plug-in. In addition, the critical section criteria also is applicable in a transparent virtualization environment (such as Intel VT).

Accordingly, the second mechanism comprises in raising the vCPU priority for spin lock holders. When an operating system holds a spin lock, it always masks vCPU interrupts. The vCPU interrupt masking is managed by VMM (virtual machine monitor) and therefore such criterion does not require any additional changes in the guest operating system. On the other hand, in order to provide information to VMM as to whether a spin lock is held by the operating system, the spin locks implementation must be changed in the guest operating system sources. For this reason, the above described approximation approach using the vCPU interrupts masking state as a criterion for priority raising is used in a preferred embodiment.

In an embodiment, the vCPU priority (P) is adjusted in the second scheduling step, depending on the vCPU interrupts masking state. For example, the priority can be increased by a constant (Bm) when vCPU interrupts are masked:

$$P(vcpu)=Tw(vcpu)+(is\_interrupts\_enabled(vcpu)?0:Bm)$$

wherein Bm designates the time period used for the load balancing, in other words, the maximum value for Tw.

When a vCPU with disabled interrupts has been elected to run on a particular physical CPU, its priority is promoted at election time, as described above. Accordingly, when such vCPU re-enables interrupts, it virtually drops its priority and the physical CPU on which it is running should be re-scheduled in order to re-elect a new (potentially different) vCPU to run thereon. The VMM usually has a mechanism allowing causing a VM interruption and transition to the VMM when vCPU interrupts are re-enabled. Accordingly, the VMM can implement such an eager priority dropping mechanism (i.e., re-scheduling). On the other hand, each extra transition to the VMM results in an extra overhead penalizing the overall guest performance.

In an embodiment of the invention, a lazy priority dropping mechanism is used which avoids an explicit vCPU interruption for re-scheduling on interrupts re-enabling. In other words, no action is taken when vCPU interrupts are re-enabled by a guest. Instead, the new vCPU state is automatically taken into account at the next re-scheduling caused by whatever event (interrupt, for example). In this case, the critical section exit is taken into account at the next interrupt time when the scheduler is called again. Otherwise, a fake pending event can be used by the scheduler in order to force a re-scheduling once the vCPU interrupts are re-enabled again. Such a fake pending event is posted by the scheduler each time a promoted vCPU is scheduled. For example, on Intel VT architecture, the interrupt window VMEXIT can be used for this purpose. This implements the spin lock holder pre-emption avoidance as described above in connection with the lazy priority dropping mechanism.

vCPU Migration Throttling

It is preferred to minimize the number of vCPU migrations from one physical CPU to another because each migration introduces an overhead which can be split into two categories: direct and indirect:

The direct migration overhead is related to direct actions taken by the scheduler to migrate a vCPU from one CPU to another. The overhead level typically depends on the virtualization technology. The direct overhead is typically quite low with a para-virtualization technology but can be quite significant with a transparent virtualization based on hardware assistance. In the latter case, the vCPU state is typically cached in the hardware.

The indirect migration overhead is related to the TLB (translation lookaside buffer) and level one caches located in the physical CPU. When migrating from one physical CPU to another, the TLB and level one data/instruction caches containing the guest translations/data are typically lost and they have to be re-populated again on the destination CPU.

In order to throttle the vCPU migration, a local bonus (Bl) can be added to the priority calculation formula:

$$P(vcpu)=Tw(vcpu)+(is\_interrupts\_enabled(vcpu)?0:Bm)+(is\_local(vcpu)?Bl:0)$$

The value of such a local bonus can be arbitrary and is preferably determined using some typical bench marks. Preferably, the local bonus is greater than the migration overhead.

VM Migration

The basic vCPU migration mechanism implemented for the load balancing can also be used to support the VM migration feature.

A typical use case is a VM migration caused by the physical CPU off line. All vCPUs running on a physical CPU being shut down have to be migrated to other running CPUs.

Such a migration requires the physical CPU resource re-distribution among running VMs. Preferably, for each possible physical CPU configuration (e.g., 1, 2, 3, or 4 CPUs), a dedicated CPU resource allocation policy is provided. When switching from one configuration to another, the scheduler migrates vCPUs and adjusts the scheduling policies according to the new configuration.

In an embodiment, an implicit re-configuration is implemented. For example, when shutting down one CPU on a bi-core platform running one SMP GPOS and one UP RTOS, all vCPUs are migrated to the single running CPU. Typically, in such a system, the RTOS has a higher priority in order to ensure the real-time characteristics for critical applications. When running in degraded mode on a single CPU, the CPU allocation policy is kept unchanged by penalizing the GPOS applications rather than the critical ones.

Other Aspects and Embodiments

It will be clear from the forgoing that the above-described embodiments are only examples, and that other embodiments are possible and included within the scope of the invention as determined from the claims.

What is claimed:

1. A scheduling method for a data processing system comprising at least one physical CPU, and one or more virtual machines each assigned to one or more virtual CPUs, the method comprising:

assigning a scheduling priority P to each of said virtual CPUs in accordance with a waiting time Tw associated with each of said virtual CPUs, wherein said waiting time Tw reflects the time for transition from ready to running state and the selection of at least one of said virtual CPUs is performed based on the scheduling priority P;

a first scheduling step in which one of said virtual machines is elected to run on said physical CPU;

a second scheduling step in which at least one of the virtual CPUs assigned to the elected virtual machine is elected to run on said physical CPU, wherein the second scheduling step is performed on said physical CPU, and wherein the election is performed based on the scheduling priority P and wherein said second scheduling step comprises selecting said at least one of said virtual CPUs based on a waiting time Tw associated with each of said virtual CPUs, wherein said waiting time reflects the time for transition from ready to running state; and selecting the virtual CPU associated with the highest scheduling priority P calculated in accordance with the following formula:

$$P=Tw+Bm+Bl$$

wherein

Bm=predetermined interrupt masking bonus
Bl=predetermined locality bonus.

2. The method of claim 1, wherein Bm is determined to promote virtual CPUs with masked interrupts for selection in the second scheduling step.

3. The method of claim 1, wherein Bl is determined to promote local virtual CPUs already selected to run on said physical CPU.

4. Data processing system, comprising:
at least one physical CPU;
one or more virtual machines each assigned to one or more virtual CPUs; and
a scheduler comprising:
  a first scheduler for electing one of said virtual machines to run on said physical CPU; and
  a second scheduler for electing at least one of the virtual CPUs assigned to the elected virtual machine to run on said physical CPU;
wherein the second scheduler is adapted to perform a scheduling operation on said physical CPU, the scheduling operation comprising selecting said at least one of said virtual CPUs based on a waiting time Tw associated with each of said virtual CPUs, wherein said waiting time reflects the time for transition from ready to running state;
wherein said data processing system is adapted to assign a scheduling priority P to each of said virtual CPUs in accordance with the waiting time Tw associated with each of said virtual CPUs, and to perform the selection of said at least one of said virtual CPUs based on the scheduling priority P;
wherein said data processing system is adapted to select the virtual CPU associated with the highest scheduling priority P calculated in accordance with the following formula:

$$P=Tw+Bm+Bl$$

wherein

Bm=predetermined interrupt masking bonus
Bl=predetermined locality bonus.

5. The data processing system of claim 4, adapted to determine Bm to promote virtual CPUs with masked interrupts for selection in the second scheduling step.

6. The data processing system of claim 4, adapted to determine Bl to promote local virtual CPUs already selected to run on said physical CPU.

* * * * *